Jan. 12, 1932. W. D. ARCHEA 1,840,300
MILLING MACHINERY
Filed March 4, 1929 4 Sheets-Sheet 1

Inventor
WALTER D ARCHEA
By AHParsons
Attorney

Inventor
WALTER D. ARCHEA
By *HK Parsons*
Attorney

Jan. 12, 1932.    W. D. ARCHEA    1,840,300
MILLING MACHINERY
Filed March 4, 1929    4 Sheets-Sheet 4

Inventor
WALTER D. ARCHEA
By *AHParsons*
Attorney

Patented Jan. 12, 1932

1,840,300

UNITED STATES PATENT OFFICE

WALTER D. ARCHEA, OF CINCINNATI, OHIO, ASSIGNOR TO THE CINCINNATI MILLING MACHINE COMPANY, OF CINCINNATI, OHIO, A CORPORATION OF OHIO

MILLING MACHINERY

Application filed March 4, 1929. Serial No. 344,106.

This invention relates to milling and sawing machinery and has particular reference to a novel and improved machine for performing simultaneous cutting and milling operations on a plurality of work pieces.

One of the objects of the present invention is the provision of a machine for straddle milling and sawing off the cap of a connecting rod.

A further object of the invention is the provision of novel and improved work indexing or positioning mechanism for satisfactorily, sequentially presenting different portions of a work piece simultaneously to the corresponding cutting and milling member or members.

Another object of the invention is the provision of an index mechanism for shifting the work pieces to successive positions automatically with extreme accuracy.

An additional object of the invention is the provision of novel and improved work controlling mechanism for sequentially engaging or releasing a plurality of work pieces and for positively locking the work pieces in position during operation of the machine.

A further object of the invention is the provision of mechanism whereby the same cutters may operate simultaneously on a plurality of work pieces and successively perform similar operations on different portions of the individual work piece.

Other objects and advantages of the present invention should be readily apparent by reference to the following specification taken in connection with the accompanying drawings forming a part thereof, and it will be understood that any modifications in the specific structural details hereinafter illustrated and described may be made within the scope of the appended claims without departing from or exceeding the spirit of the invention.

In the drawings in which similar characters of reference are employed to denote corresponding parts throughout the several views.

Figure 1:
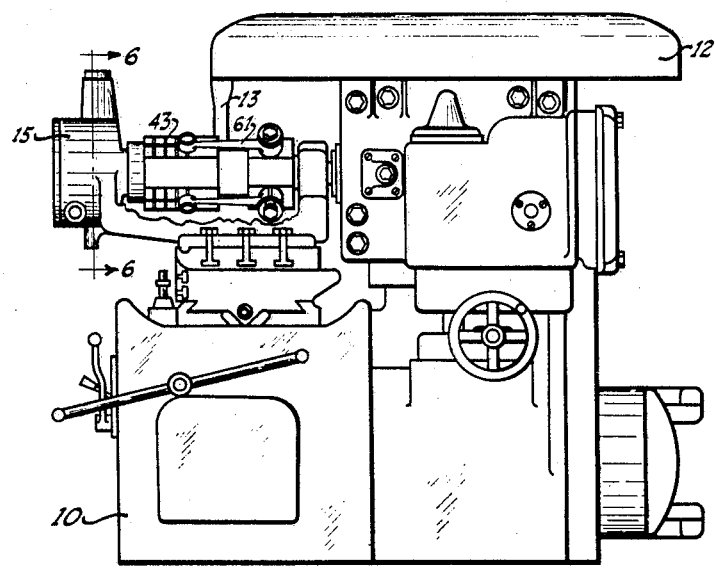
Figure 1 is a side elevation of a machine embodying the invention.
Figure 2:
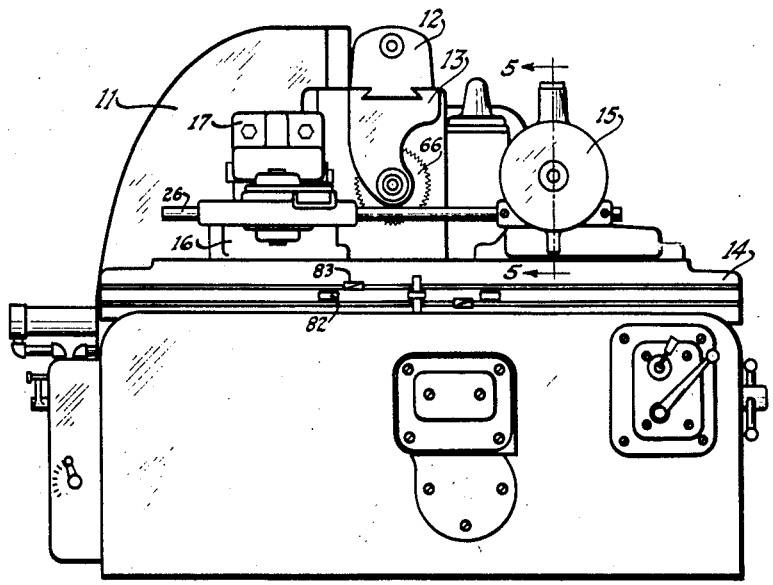
Figure 2 is a front elevation thereof with the table and indexing fixture in a retracted position.
Figure 9:
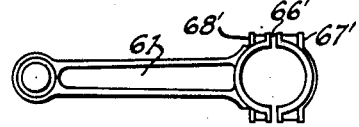
Figure 9 shows a work piece which has been operated upon by the device herein disclosed.

The reference character 10 denotes an elongated bed or support having the column 11 fixed thereto with over-arm 12 adjustably supported thereon from which depends the arbor support 13 for the arbor 9 which carries the saw 66 and mills 67 and 68. Slidably mounted on the bed 10 is the table 14 which is reciprocated by hydraulic mechanism forming no part of this invention but whose operation is diagrammatically shown in Figure 8 and is more specifically described later.

Fixed to one end of the table 14 is the indexable mechanism 15 and to the other end of the table is fixed a frame 16 whereby it will be seen that there is no relative motion between index fixture 15 and frame 16.

Fixed to the column 11 is a bracket 17 having secured thereto the plates 18 and 19 spaced to provide a cam slot 20 whose direction is at an angle of approximately 45° to the direction of movement of the table 14. A rack bar 23 slidable in sleeve 24 of frame 16 has at one end a roller 22 engageable in said slot. At its opposite end the rack portion of the bar meshes with pinion 25 rotatably supported by the frame.

Also in mesh with pinioned gear 25 is a reciprocating rack 26 traveling in a sleeve 21 in a direction at right angles to the rack 23 the other end of rack 26 being in mesh with the oscillating gear 27 which is part of the indexable mechanism.

It will be obvious that when the table reciprocates frame 16, roller 22 will travel in slot 20 thereby drawing the rack 23 inwardly and likewise and at the same time moving rack 26 so as to oscillate gear 27, and that when the table reverses its direction of movement each of these gears and racks will be moved in an opposite direction; thus as the table is reciprocated back and forth gear 27 will be automatically oscillated back and forth supplying power for operating the indexable mechanism.

The oscillating gear 27 is attached and keyed to a sleeve 28 which in turn is keyed to a shaft 30, the sleeve 28 bearing in a cover plate 34 affixed to one end of index fixture 15 of the indexable mechanism.

Shaft 30 is journaled in a sleeve 42 attached to the index plate 36 and sleeve 42 rotates in a bearing in the index fixture 15 and the end of shaft 30 provides a bearing for an index shaft 45 which rotates in a bearing at the other end of the index fixture 15. Assembly plates 44 fixedly connect the shaft 45 to an index barrel 43 which in turn is affixed to the said sleeve 42 and thus to index plate 36 and thus it will be seen that shaft 45 and barrel 43 will rotate as a unit whenever index plate 36 is actuated.

Exteriorly of the barrel 43 is found the work placing guide means 58 which is adjustably affixed in the longitudinal slots 69 whereby different size work pieces may be accommodated and non-rotatably affixed in assembly plates 44 is found the companion work piece placing guide means 57 for the work pieces 59 to 62 inclusive. Passing through the latter guide means and guided against rotation therein by a pin and slot arrangement is a work piece clamping plunger 56 having a threaded end on which is placed a nut 63 whose maximum diameter is less then the minimum diameter of the opening in the end of the work piece in which the cuts 66', 67' and 68' are to be made, and thus permit the work piece to pass by the nut onto the guides 57 and 58.

Next to the threaded end of clamping plunger 56 is a reduced and flattened portion 64 on which is removably placed a horseshoe shaped washer 65 having grooves corresponding to the cuts 66', 67' and 68' so that when plunger 56 is drawn into clamping position, nut 63 will bear against washer 65 which will in turn bear against the work piece while the grooves in the washer will prevent interference with the cuts to be made.

Plunger 56 has a spring 55 bearing against it, the other end of spring 55 bearing against the barrel shaft 45, whereby the spring 55 tends to urge plunger 56 outwardly and hence to an unclamping position. This end of clamping plunger 56 passes through an opening 53 in a rock lever 51 which lever bears against a shoulder 54 on clamping plunger 56 whereby the rocking motion of lever 51 becomes an up and down motion of clamping plunger 56.

Lever 51 rocks about its pivot 52 the other end of this lever being bifurcated and in the bifurcated end is journaled a wheel 50 which rides on and off a wedge 49 on the end of a sliding clamping sleeve 47. Yieldably bearing in this sleeve through the medium of a strong spring 48 which will bear considerable pressure before yielding is a slide 46 affixed to the sleeve 47 by a pin and slot arrangement whereby the slide may positively retract the sleeve but may have its pressure against the sleeve limited according to the strength of the spring 48. Affixed to the end of slide 46 is a roller 33 operating in the cam slot 32 of a cam member 31 affixed to and oscillating with the shaft 30. Thus as shaft 30 oscillates the cam portion of cam slot 32 will cause the rollers 33 therein to positively retract the slide 46 and thus the sleeve 47 withdrawing the wedge 49 from under the rock lever 51 allowing it to be pivoted by the spring 55 which thus raises the clamping plunger 56 to release the work piece held thereby, whereby the washer may be withdrawn, a new work piece substituted and the washer replaced. On the completion of the cycle of operation the roller 33 will enter the uncammed portion of the slot causing it to advance the slide and thus the wedge pivoting the rock lever to bear down against the shoulder 54 of the clamping plunger 56 to clamp the new work piece in place. Should anything positively prevent the clamping plunger 56 from operating as by some foreign object getting between the work piece and the washer or the nut, then spring 48 will yield, to prevent breakage of parts, and the machine can be stopped by the operator for adjustment.

Figure 7:
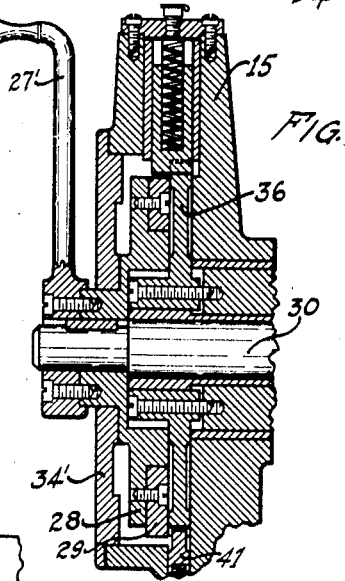
Figure 7 is a modification showing a manual actuation of the index mechanism.

In Figure 7 a modification is shown wherein the power is to be manually supplied and we find here a handle 27' which is to be manually oscillated back and forth in the same manner that gear 27 is automatically oscillated.

Figure 6:
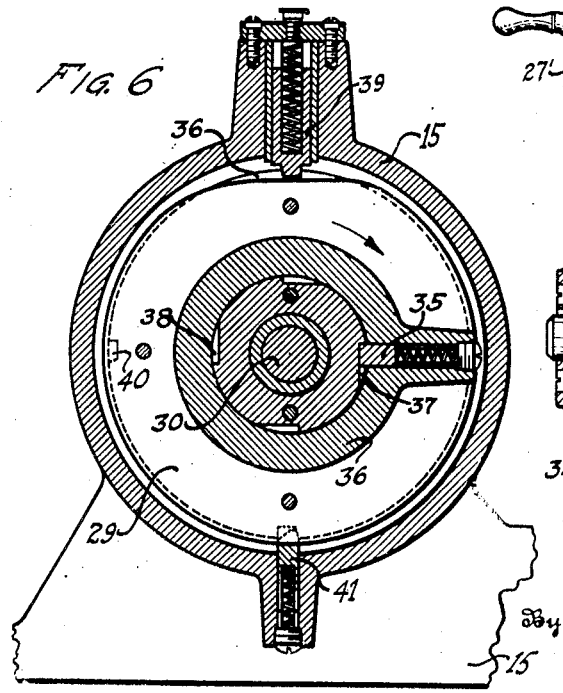
Figure 6 is a vertical section on the line 6—6 of Figure 1.

A cover plate 34 and in Figure 7 a corresponding cover plate 34' provides a bearing for the sleeve 28 and in turn for shaft 30, and is affixed to the index fixture 15. In sleeve 28 we find a spring pressed pawl 35 which rides on a shoulder of an index plate 36 which shoulder has a plurality of one way seats or ratchets 37 and 38 while a spring pressed locking plunger 39 is affixed in the index fixture 15 so that its end rides on the cam 29 and on the periphery of the index plate 36 and is shaped to exactly fit notches 40 formed on the periphery of index plate 36; it being noted that these notches are shaped so as to have one right angle and one angle greater than the right angle whereby the plunger may easily enter and leave the notch but make full contact therewith when in and thereby effectively prevent any advance movement of index plate 36 until it has been raised out of the notch by riding on the cam 29. Also fixed in index fixture 15 is a spring pressed detent 41 so placed as to enter notch 40 but to make no contact with cam 29. The end of the detent 41 is beveled in one direction so that index plate 36 may travel in a forward direction but may not at all traverse in a reverse direction and thus it will be seen that when the table is at the cutting position with the cam and index plate in the position shown in Figure 6 and starts to move away therefrom, automatically operated rack 26 will force gear 27 to turn in one direction and the gear 27 is timed so as to make exactly one quarter turn while the table is traveling on the bed in the direction away from the cutting position causing the sleeve 28 and cam 29 to turn with the gear 27 in the same direction, which is the direction shown by the arrow in Figure 6.

Figure 4:
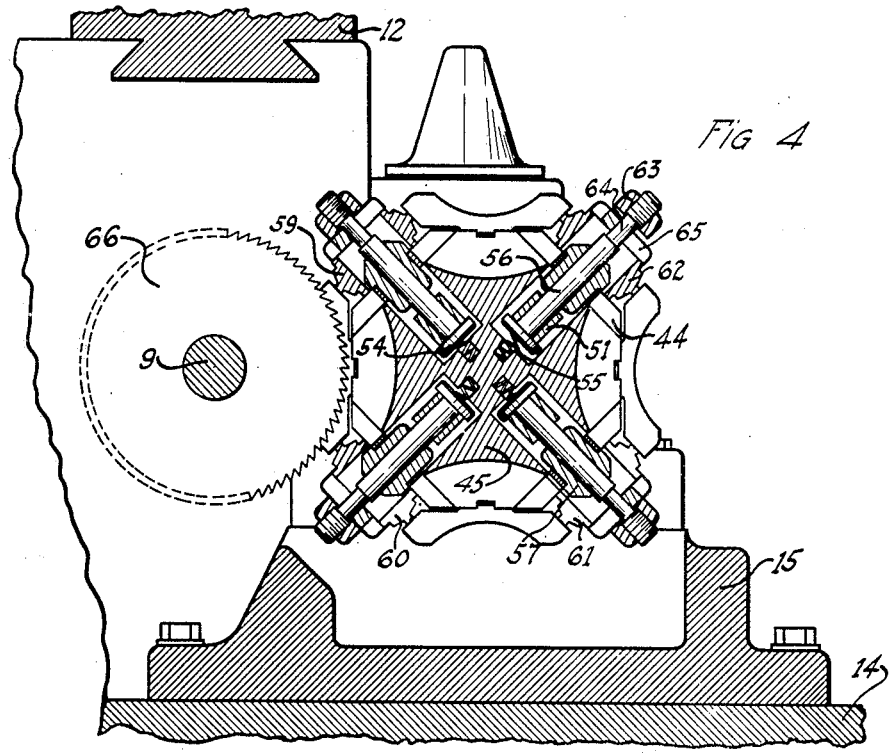
Figure 4 is a vertical section on line 4—4 of Figure 5 with the indexing fixture moved forward to cutting position.

Pawl 35 will then ride out of its ratchet 37 and advance to the first ratchet 38 and plunger 39 will ride on cam 29 and be lifted out of its notch 40 thereby freeing the index plate 36 for rotation in a forward or work advancing direction. Detent 41 will prevent index plate 36 from rotating with the sleeve 29 in the direction of the arrow but will allow it to rotate in the opposite direction, after pawl 35 has entered ratchet 38 and plunger 39 is held out of its notch 40 by cam 29, due to the beveled end on detent 41; and shaft 30 being keyed to gear 27 will likewise make a quarter turn so that during movement of the table away from cutting position shaft 30 will be in rotation relative to index plate 36, which is held fixed during this movement, but when the table is approaching the cutting position, the shaft 30 will be rotating simultaneously in the same direction with index plate 36 so that at this time there is no relative movement between shaft 30 and index plate 36. Thus it will be seen that the shaft 30 has an oscillating movement while index plate 36 has only a one way movement, whereby the rotation of index plate 36 will serve to rotate the barrel in a step by step movement for indexing the work pieces to present a new work piece to the cutters at each step while the oscillation of shaft 30 through means described above serves to sequentially clamp and release the work pieces in place on the barrel. As will be seen on the drawings in Figure 4 work piece 59 has not yet been operated upon and is about to receive its first cuts, that the work piece 60 has received its first cuts and is about to receive its second cuts; that the work piece 61 has been completed and shows at 66′ the cut made by saw 66 and at 67′ and 68′, the cuts made by mills 67 and 68 while the work piece 62 has just been inserted to take the place of work piece that has just been completed and removed.

Thus, there are four work pieces on the device at one time one of which has just been placed on. Due to their position about the index barrel and the position of the cutter means comprising the saw 66 and the mills 67 and 68, the work piece when first presented to the cutter means will receive three cuts simultaneously.

Figure 3:
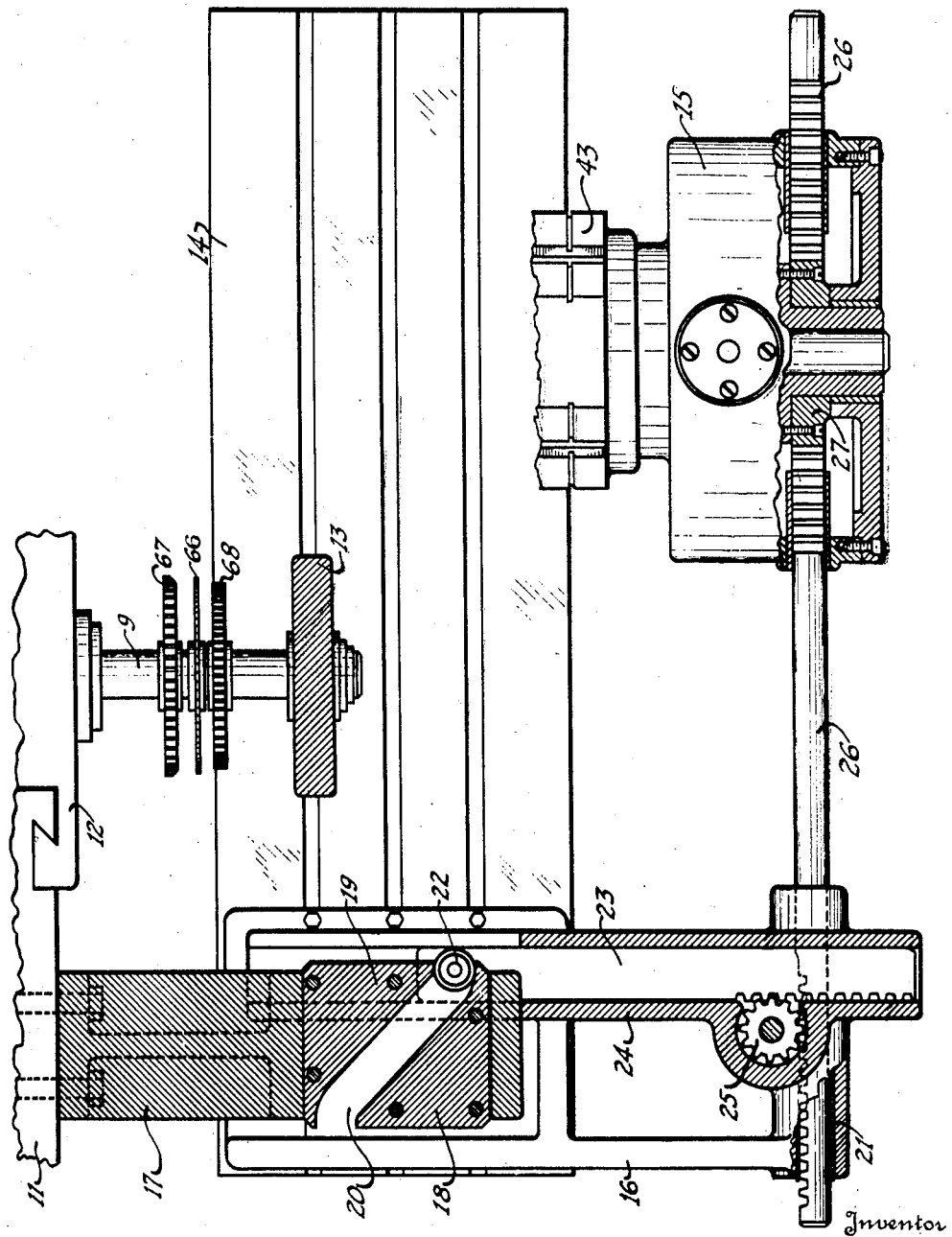
Figure 3 is a horizontal sectional view of the automatic operating mechanism shown with the indexing fixture broken away.

The table will then be moved away by the means about to be described, the barrel will be indexed a quarter of a revolution and the work piece will be presented to the same cutter means again to receive three additional cuts simultaneously the same cutter means making the corresponding cuts and at the same time, the cutter means will perform similar operations on the new work piece now presented to it for the first time. On the third quarter revolution, the completed work piece will be rotated away from the cutters and on the fourth quarter revolution the oscillation of shaft 30 will unclamp the completed work whereby it may be removed and a new one inserted by the operator. It will be observed in Figure 4 wherein the work pieces are about to be cut that the indexing movement is complete, for at this position roller 22 is at the other end of slot 20 from the position shown in Figure 3 and as the cutting operation proceeds, roller 22 leaves the slot and hence causes no actuation of the rack and the indexable mechanism until the cutting operation is completed for this cycle whereupon the table reciprocates, causing the roller to reenter the slot and actuate the indexable mechanism.

Figure 8:
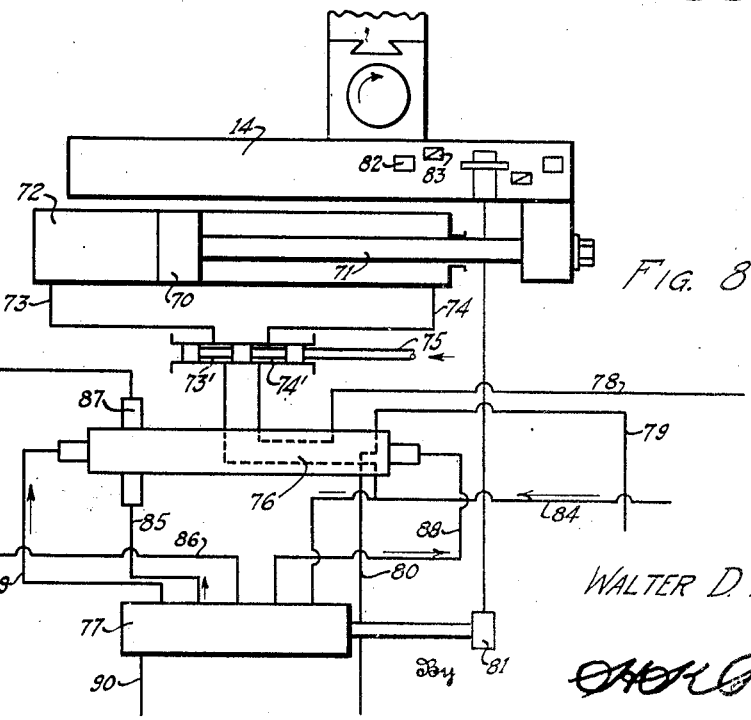
Figure 8 is a diagram of the hydraulic mechanism for moving the table.
Figure 5:
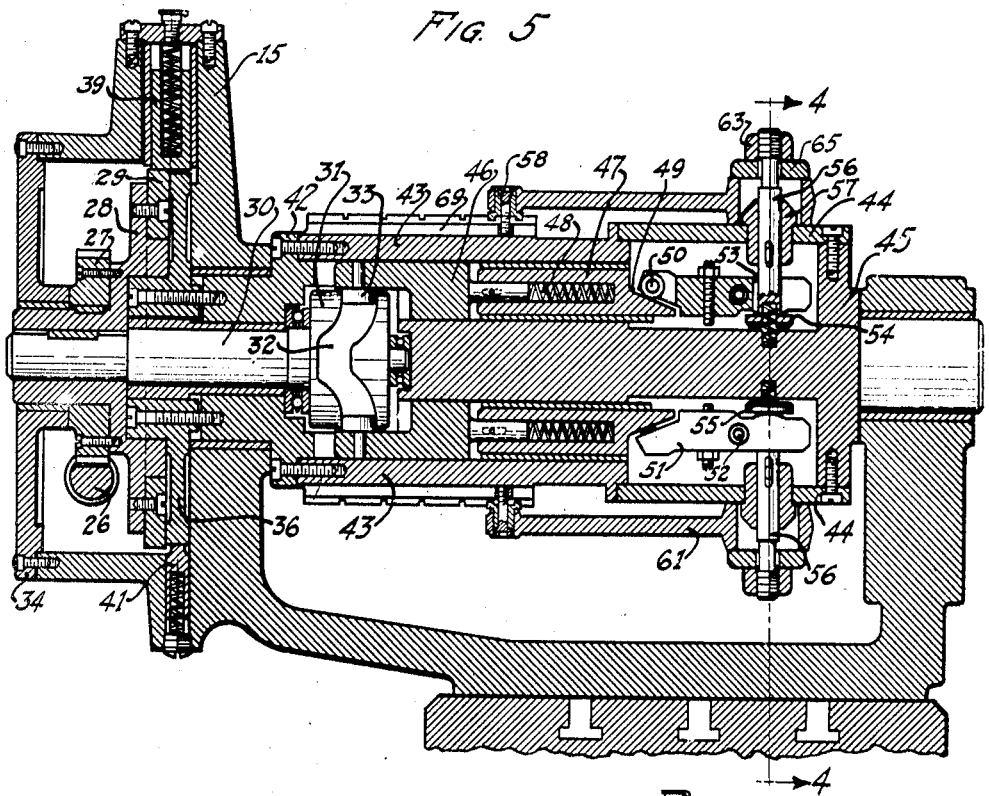
Figure 5 is a vertical section on line 5—5 of Figure 2 the position shown in Figure 2.

The operation of the hydraulic mechanism for reciprocating the table member diagrammatically shown in Figure 8 is as follows: Said table member is adapted to be moved on the bed by suitable mechanism such as the piston 70 coupled with the table 14 by rod 71. This piston is actuable in cylinder 72 by hydraulic power introducable through lines 73 and 74 to opposite ends of the cylinder. The actuation of the table is controlled by a series of hydraulic valve mechanisms including a stop or short circuiting valve 75, a selector valve 76 and a pilot or actuating valve 77. The main or selector valve has leading thereto the feed pressure supply line 78 and rapid traverse supply line 79.

It is capable of reciprocating or longitudinal movement for reversing the connection between its ports 73′ and 74′ leading to lines 73 and 74 respectively so that the desired actuating fluid for feed or rapid traverse may be admitted to either end of the cylinder, and the opposite end coupled with discharge line 80. In addition the selector valve is rotatable to selectively couple the inlet side of the valve with the feed line 78 or rapid traverse line 79 as may be preferred. It being desirable that these several couplings be automatically effected and controlled, use is made of the pilot or control valve 77 having a trip portion 81 designed to be operatively shifted into different effective positions as by dogs 82 and 83 on the table 14.

This member has coupled therewith the pressure or hydraulic inlet line 84 which may be shunted or directed by movement of the trip 81 through lines 85 or 86 to actuate the selector valve rotor located at 87 thereby changing the actuation of the table from quick traverse to feed or the reverse. In addition, the pilot valve is selectively actuable as indicated to couple the pressure line with either conduit line 88 or 89, the other line in either event being coupled with the exhaust 90.

From the foregoing description taken in connection with the drawings, the construction of the present improved indexing milling machine should be readily understood and it will be seen that there has been provided a machine capable of handling a plurality of work pieces simultaneously so that simultaneous operations may be performed on an individual work piece, and that a plurality of work pieces may be operated on simultaneously by the same cutter means, and that the actual indexing of the several work pieces in a step by step manner if performed with extreme accuracy to exactly relate each individual work piece to the particular cutters operating thereon.

I claim:—

1. In a milling machine having a reciprocating table and cutter means, the combination of an indexable work holding mechanism, means for imparting a step by step rotation to said mechanism at each reciprocation of the table to sequentially present a new work piece to the cutter means, auxiliary means operatively coupled with the indexing means for automatically releasing each work piece subsequent to the final operation thereon.

2. In a milling machine having a reciprocating table and cutter means, the combination of an indexable work clamping mechanism, means for imparting a step by step rotation to said mechanism at the end of each reciprocation of the table to and from cutting position to sequentially present a new work piece to the cutter means, coupled with means for automatically releasing each work piece subsequent to the final operation thereon, said automatic means including an actuating cam oscillatable with and relative to said mechanism.

3. In a milling machine having a reciprocating table and cutter means, the combination of an indexable work holding mechanism, means for imparting a step by step rotation to said mechanism at each reciprocation of the table to sequentially present a new work piece to the cutter means, coupled with means for automatically releasing each work piece subsequent to the final operation thereon, said automatic means including individual work securing clamps and a cam member for urging the clamps into operative engagement with the work during a portion of the rotation thereof, and for subsequently releasing the same.

4. In a milling machine having a reciprocating table and cutter means, the combination of an indexable work holding mechanism, means for imparting a step by step rotation to said mechanism at each reciprocation of the table to sequentially present a new work piece to the cutter means, coupled with means for automatically releasing each work piece subsequent to the final operation thereon, said automatic means including individual work securing clamps, a cam member for urging the clamps into operative engagement with the work during a portion of the rotation thereof and for subsequently releasing the same, and yieldable means interposed between the clamps and the cam member for limiting the pressure applied thereby.

5. In combination with a milling machine having cutter means and a reciprocating table in operative relation thereto, a rotatable work holding unit on said table, means for imparting rotation to said unit including a fixed cam plate, a rack bar slidably mounted on the table having a roller traversing the plate on reciprocation of the table, an actuator coupled with the unit and operative connections between the actuator and the rack bar for operation on cam actuated movement of the rack bar.

6. In combination with a milling machine having cutter means and a reciprocating table in operative relation thereto, a rotatable work holding unit on said table, means for imparting rotation to said unit including a fixed cam plate, a rack bar slidably mounted on the table having a roller traversing the plate on reciprocation of the table, an actuator coupled with the unit and operative connections between the actuator and the rack bar for operation on cam actuated movement of the rack bar, said actuator including an oscillatable cam, said unit including an index plate through which rotation to said unit is imparted and pawl and ratchet means operatively connecting said index plate and said oscillatable cam whereby said oscillatable cam will give step by step rotation to said unit.

7. A milling machine including a reciprocating table, a support therefor, a bracket in fixed relation to said support having an angular cam slot therein, a guide sleeve fixed on said table, a reciprocable rack operable in said sleeve, a roller on said rack engageable and disengageable with the walls of said slot for reciprocation of the rack on relative movement of the table and bracket, an indexable mechanism also fixed on said table, and means for translating the motion of said rack to said indexable mechanism.

8. A milling machine including a reciprocating table, a support therefor, a bracket in fixed relation to said support having an angular cam slot therein, a guide sleeve fixed on said table, a reciprocable rack operable in said sleeve, a roller on said rack engageable and disengageable with the wall of said slot for reciprocation of the rack on relative movement of the table and bracket, an indexable mechanism also fixed on said table, means for translating the motion of said rack to said indexable mechanism, said means comprising a pinion movable by said rack, a second rack reciprocable by said pinion in a direction at right angles to said first rack, a gear oscillatable thereby, an index plate connected to the indexable mechanism having a pawl and ratchet connection with said gear whereby said index plate may be rotated step by step by the reciprocation of the table and may transmit a like motion to the indexable mechanism.

9. In a machine of the character described, the combination with a cutter member, of indexable mechanism for presenting work pieces thereto including a carrier for the work pieces and clamping means for holding work pieces on said carrier, of a control cam mounted for oscillation with and relative to said carrier, said cam including an offset portion and connections between said clamping means and said cam for rendering the clamping means operative during movement of the carrier, said connections being engageable by the offset portion for sequentially releasing the finished individual work pieces.

10. In combination with a reciprocating table operating on a stationary bed, a connecting rod sawing and milling machine comprising an index mechanism attached to said table, a geared cam in said mechanism, a frame attached to the other end of said table, a rack slidable therein, a bracket supported by said bed, an angular cam slot in said bracket, a roller on said rack movable in said cam slot whereby reciprocating motion of said table causes reciprocating motion of said rack transversely of said table, means for transmitting reciprocating motion from said rack to the geared cam in the indexable mechanism, an index plate in said index mechanism, means actuated by the geared cam for causing said index plate to rotate in one direction with the cam gear, means holding said index plate against rotation in the opposite direction, work piece placing guides on said index mechanism, additional cam means in said index mechanism, a plurality of clamping means for holding the work pieces, means operated by said additional cam means to cause said clamping means to sequentially clamp and release the work pieces, one work piece being released at each reciprocation of the table.

11. A milling machine comprising a bed and a reciprocating table thereon, a rotating indexable mechanism fixed on said table, means operated by the reciprocation of the table causing said indexable mechanism to rotate step by step with each reciprocation of the table, work piece clamping and releasing means on said indexable mechanism actuated by said first named means; cutter means operatively supported relative to said table whereby said index presents a new work piece to said cutter means with every reciprocation of the table.

12. An indexing mechanism comprising a rotating index barrel, means for non-reversibly rotating said barrel step by step, cam means mounted within said barrel, said cam rotating simultaneously with said barrel and reversely rotating during the non-rotating period of said barrel, rocking means sequentially operated by said cam and work clamping and releasing mechanism on said barrel sequentially operated by said rocking means.

13. An indexing mechanism comprising a rotating index barrel, means for non-reversibly rotating said barrel step by step, cam means mounted within said barrel, said cam rotating simultaneously with said barrel and reversely rotating during the non-rotating period of said barrel, rocking means sequentially operated by said cam, work clamping and releasing mechanism on said barrel sequentially operated by said rocking means, and yieldable means interposed between said cam and said rocking means limiting the clamping pressure thereof.

14. A milling machine comprising a reciprocating table, a bed or support therefor, a bracket projecting from said bed or support and having a cam slot therein, said table having an indexable mechanism at one end thereof, a frame fixed at the other end of said table for translation relative to the said bracket, the frame having a guide sleeve therein, a rack slidably and reciprocably supported in said sleeve, roller on said rack, said roller traveling into, in and out of said slot and means for transmitting motion of said rack to said indexable mechanism.

15. A milling machine comprising a reciprocating table, a bed therefor, a bracket projecting from said bed or support, said bracket having an angular slot therein, said table having an indexable mechanism at one end thereof, a frame fixed at the other end of said table for translation relative to the said bracket, the frame having a guide sleeve therein, a rack slidably and reciprocably supported in said sleeve, a roller on said rack, said roller engaging said slot at the end of the return stroke of the table and disengaging said slot at the beginning of the forward stroke of the table, means for transmitting motion of said rack to said indexable mechanism, said means comprising a gear in mesh with said rack, said gear being in mesh with a second rack reciprocating at right angles to the direction of said first rack, and a gear in said indexable mechanism in mesh with said rack whereby said last mentioned gear is oscillated automatically by the reciprocation of the table.

16. In a machine of the character described, having a bed, a reciprocating table thereon, cutter means on said bed in operative relation to said table, the combination of a bracket on said bed, a frame on said table, cam means on said bracket, a rack on said frame having a roller engageable by said cam, indexable work clamping and releasing means on said table, operative connections between said rack and said indexable work clamping and releasing means for automatic operation thereof when said table reciprocates.

17. In a machine of the character described, having a bed, a reciprocating table thereon, cutter means on said bed in operative relation to said table, the combination of a bracket on said bed, a frame on said table, cam means on said bracket, a rack on said frame having a roller engageable by said cam, indexable work clamping and releasing means on said table, operative connections between said rack and said indexable work clamping and releasing means for automatic operation thereof when said table reciprocates, said operative connections comprising a second reciprocating rack at right angles to said first rack, an intermediate pinion for transmitting motion from one rack to the other, said second rack serving to operate an oscillating gear and shaft in said indexable means, said oscillating gear having a pawl and ratchet connection to an index plate thereby serving to automatically give a step by step movement to said index plate as said table is reciprocated and thus to index the indexable means, a cam on said shaft and means operated by said cam for automatically and sequentially operating said work clamping and releasing means as said work is indexed.

18. A milling machine having a support and a reciprocating table thereon, cutter means and a cam bracket adjacent thereto carried by an upstanding portion of said support, an indexable work holder and an actuating member therefor mounted in spaced relation on the table and on opposite sides of said cutter means and bracket, means to reciprocate the table to effect engagement of said cutter means with the work upon movement in one direction and engagement of said actuating member with said cam bracket upon opposite movement of the table.

19. A milling machine having a support, a reciprocable table thereon, cutter means carried by an arbor journaled in said support, an indexable work holding drum mounted on the table on an axis parallel to said arbor, means to hold longitudinal work pieces on said drum, including clamping means for engaging an end of a work piece and positioning means adjustably spaced therefrom for engaging the other end of the work whereby work pieces of various lengths may be accommodated in said machine.

20. In a milling machine having a support and a reciprocating table thereon, cutter means carried by an upstanding portion of said support, an indexable drum mounted on the table for cooperation with said cutter means, a plurality of work holders on the drum, an actuator carried by the table, fixed external means adapted to engage said actuator upon movement of the table in one direction to effect simultaneously the release of one of said work holders and the clamping of another and upon movement of the table in the opposite direction to effect indexing of said drum.

21. In combination with a milling machine having cutter means and a reciprocating table in operative relation thereto, a work holding unit pivotally mounted about an axis on said table, means for imparting movement to said unit about said axis including a fixed cam plate, a rack bar slidably mounted on the table having a roller traversing said plate on reciprocation of the table, an actuator coupled with the unit and operative connection between the actuator and the rack bar for operation of the unit on cam actuated movement of the rack bar.

22. In a machine of the character described the combination with cutter means and a table reciprocable in operative relation thereto, of a work holder carried by the table for movement about an axis thereon, a member slidably mounted on the table, means for imparting movement to the member in timed relation to the reciprocation of the table including a cam and roller, one of which is fixed relative to the table the other fixed to the member, and motion transmitting means coupling the member to said work holder for operation thereof on cam actuated movement of said member.

In testimony whereof I affix my signature.

WALTER D. ARCHEA.